R. KROEDEL.
FOCUSING DEVICE.
APPLICATION FILED OCT. 5, 1908.

937,156.

Patented Oct. 19, 1909.

Witnesses
Nelson Copp

Inventor
Robert Kroedel
by Church & Rich
his Attorneys

UNITED STATES PATENT OFFICE.

ROBERT KROEDEL, OF ROCHESTER, NEW YORK, ASSIGNOR TO EASTMAN KODAK CO., OF ROCHESTER, NEW YORK, A CORPORATION OF NEW YORK.

FOCUSING DEVICE.

937,156.  Specification of Letters Patent.  Patented Oct. 19, 1909.

Application filed October 5, 1908. Serial No. 456,146.

*To all whom it may concern:*

Be it known that I, ROBERT KROEDEL, of Rochester, in the county of Monroe and State of New York, have invented certain new and useful Improvements in Focusing Devices; and I do hereby declare the following to be a full, clear, and exact description of the same, reference being had to the accompanying drawings, forming a part of the specification, and to the reference-numerals marked thereon.

My present invention relates to photography and more particularly to photographic cameras and it has for its object to provide an improved focusing attachment that will accurately and conveniently determine the proper relative positions of the movable parts that enter into the focusing operation for focusing objects at various distances from the lens.

A further object of my invention is to provide a device that will offer advantages in the matter of its attachment to the camera whereby it may be easily and accurately fitted to the requirements of particular lenses.

To these and other ends the invention consists in certain improvements and combinations of parts all as will be hereinafter more fully described, the novel features being pointed out in the claims at the end of the specification.

Figure 2:
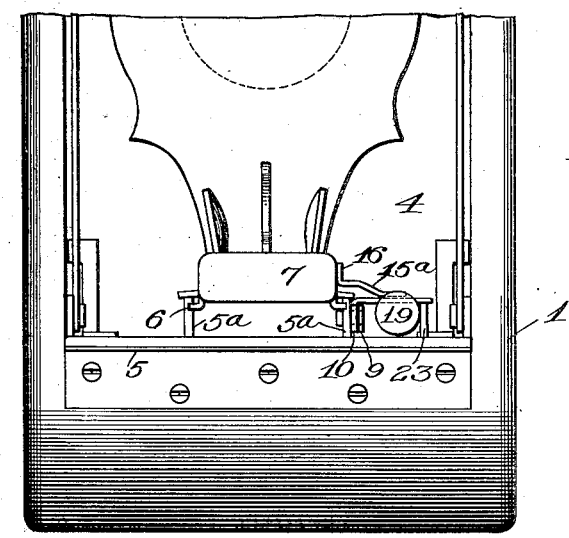
Figure 4:
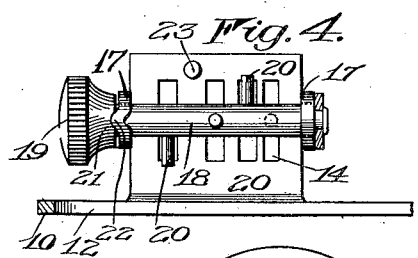
Figure 5:
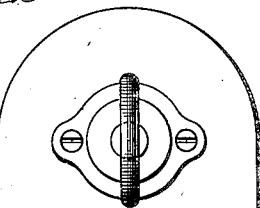
Figure 5:
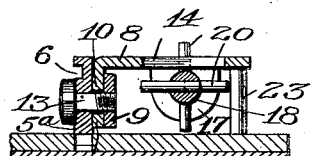
Figure 1:
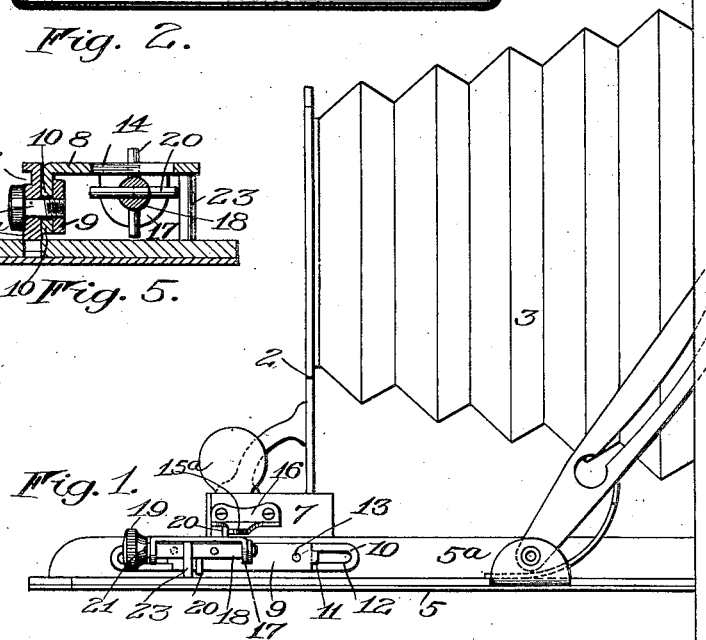
Figure 3:
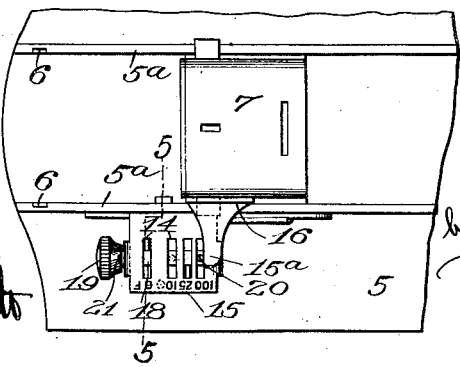

In the drawings: Figure 1 is a side elevation of a camera and of a focusing device attached thereto, constructed in accordance with and illustrating one embodiment of my invention. Fig. 2 is a front elevation thereof, the upper portion of the camera being broken away. Fig. 3 is a top plan view of the focusing devices and of adjacent portions of the camera bed. Fig. 4 is a bottom plan view of the focusing stop detached, and Fig. 5 is a transverse section substantially on the line 5—5 of Fig. 3.

Similar reference numerals in the several figures indicate similar parts.

The camera to which I have in the present instance shown my improvements attached, is of the well known "folding pocket" type comprising a body portion 1, front 2 and bellows 3 connecting these parts, the latter being housed within the usual chamber 4 in the body when the camera is folded. The chamber 4 is then closed by a door 5 that forms a bed when open, for the support of the front 2 and is provided in the present instance, with vertically extending plates 5ª having grooves 6 on their adjacent sides that form a track running longitudinally of the bed, and mounted on the track is a carriage 7 fitting the grooves 6, which carriage supports the front 2.

To the side of one of the track plates 5ª I secure a plate or bracket 8 that is made adjustable longitudinally thereof for purposes that will later appear. The securing means comprise in the present instance a clamping plate 9 slidably engaging one side of the supporting flange 10 of the bracket and positioned on the latter by means of nibs 11 that engage within a slot 12 in the said flange while screw bolts 13 threaded into the clamping plate extend through the slot and bear upon the opposite side of the track plate.

The bracket is divided on its upper face at intervals with a series of slots or openings 14, each having an adjacent index character 15, the units of the series being spaced or graduated to form a scale running parallel with the track and hence with the path of movement of the carriage 7. The latter is provided with an abutment 15ª that traverses the scale and in the present instance the said abutment is formed by a laterally extending arm 16 that projects over and a short distance above the bracket.

Journaled in downwardly extending ears 17 on the bracket is a rotary stop 18 having a knurled head 19 at one extremity for convenience in turning and the body portion of which is formed by a drum having a series of engaging portions 20 projecting radially therefrom. These engaging portions are graduated axially of the drum to correspond with the graduations of the scale so that each is adapted to coöperate with the latter by projecting through one of the slots 14 adjacent an index character 15 and into the path of the abutment 15ª on the carriage and they are spaced relatively, circumferentially of the drum in such manner that no two may lie in the path of the said abutment at the same time. To assist in centering each projection in its operative position, the head 19 of the stop 18 and one of its supporting ears 17 are provided with coöperating depressed and projecting portions 21 and 22 respectively. The bracket 8 may carry a steadying pin 23 at its outer edge if desired to bear against the bed and prevent occasional strains from being borne wholly by the attaching devices on the track.

The index characters 15 are usually given in units of distance and the device as a whole is applied to the camera after suitable tests in such position that the reading of the abutment 15ª on the scale will indicate the distance from the lens at which the object will be properly focused. To prepare the instrument for an exposure, the operator, with the aid of my improvements, has therefore simply to rotate the stop 18 until the proper projection 20 registers with the character 15 that corresponds with the estimate he has made of the distance of his object and to pull out his carriage, whereupon the latter will automatically stop through engagement of the abutment 15ª therewith at the required point of adjustment.

As different lenses of the same specifications often differ slightly in focal distance and there are apt to be other variations in the relations of the parts during the construction of the camera that will produce the same result, the focusing device, to bring about the best results, must be positioned by test and it is for this reason that the bracket 8 is adjustably mounted on the track, as previously described, where its position can be altered through manipulation of the bolts 13.

It will, of course, be understood that the focusing devices may be applied in substantially the same manner in cameras in which the focusing is done through the relative movement of a fixed lens carrying front and a movable sensitized material or screen carrying body instead of the reverse, as herein shown. Moreover, as the coöperating elements on the carriage or front and the camera bed combine to indicate and control the relative movement and adjustment of these parts, it is obvious that substantially identical results would be accomplished in substantially the same manner by interchanging the locations of the said elements, as herein shown, all without departing from the spirit of my invention.

I claim as my invention:

1. In a focusing device, the combination with a camera bed and a carriage movable thereon, one of said members being provided with an abutment, of a graduated scale on the other and a movable stop coöperating with the scale and adapted to be engaged by the said abutment, the scale being adjustable on the member in the direction of movement of the carriage.

2. In a focusing device, the combination with a camera bed and a carriage movable thereon, one of said members being provided with an abutment, of a scale graduated in units of focal distance adjustable on the other and a movable stop carried by and coöperating with the scale and adapted to be engaged by the abutment on the first mentioned member.

3. In a focusing device, the combination with a camera bed having a track thereon and a carriage movable on the track and provided with an abutment, of a graduated scale adjustable longitudinally of and mounted on the track and a movable stop carried by and coöperating with the scale and adapted to be engaged by the abutment on the carriage.

4. In a focusing device, the combination with a camera bed, a carriage movable thereon, one of said members being provided with an abutment and a graduated scale on the other, of a stop having a series of engaging portions, each unit of the series being movable into direct register with a graduation of the scale and into the path of the abutment.

5. In a focusing device, the combination with a camera bed and a carriage movable thereon, one of said members being provided with an abutment, of a rotary stop on the other having a plurality of engaging portions spaced relatively to each other in the direction of movement of the carriage and movable, selectively, into the path of the abutment through rotation of the stop.

6. In a focusing device, the combination with a camera bed and a carriage movable thereon, one of said members being provided with an abutment, of a scale on the other, a rotary stop supported thereon and having a series of engaging portions spaced relatively to each other in the direction of movement of the carriage and movable, selectively, into the path of the abutment through rotation of the stop, the said stop and its support being provided with coöperating projecting and depressed portions for centering the positions of the engaging portions of the stop.

7. In a focusing device, the combination with a camera bed and a carriage movable thereon, one of said members being provided with an abutment, of a rotary drum on the other having its axis parallel with the path of movement of the carriage and provided with a plurality of radial projections, spaced axially and circumferentially thereof, each projection being movable with the rotation of the drum into the path of the said abutment.

8. In a focusing device, the combination with a camera bed and a carriage movable thereon, one of said members being provided with an abutment, of a scale carried on the other and comprising a plate having a plurality of openings therein, the plate being so arranged relatively to the other member as to be traversed by the abutment thereon, and a rotary drum journaled beneath the plate and having a plurality of projections thereon adapted to extend successively through the openings in the plate and into the path of the abutment on the carriage as the drum is rotated.

9. In a focusing device, the combination with a camera bed and a carriage movable thereon, one of said members being provided with an abutment, of a movable stop supported on the other to engage the abutment and adjustable relatively to its support to halt the carriage at different points on the bed, the stop and its support being provided with yieldingly coöperating projecting and depressed portions for centering the stop in its different positions of adjustment.

ROBERT KROEDEL.

Witnesses:
RUSSELL B. GRIFFITH,
LUCY A. VAN COURT.